United States Patent Office.

CARL SCHAEFFER, OF ELIZABETH, NEW JERSEY.

*Letters Patent No. 105,132, dated July 5, 1870.*

IMPROVEMENT IN THE MANUFACTURE OF ARTIFICIAL STONE.

*The Schedule referred to in these Letters Patent and making part of the same.*

To all whom it may concern:

Be it known that I, CARL SCHAEFFER, of Elizabeth, in the county of Union and State of New Jersey, have invented a new and improved Artificial Stone; and I do hereby declare the following to be a full, clear, and exact description thereof, which will enable those skilled in the art to make and use the same.

This invention relates to a compound of sand, cement, pounded shells, and litharge, dissolved in diluted sulphuric acid, which, after having been molded to the required form or shape, is treated with a solution of silicate of potash, in such a manner that, by the action of the silicate, the pounded shells or carbonate of lime, and the litharge, are transformed into silicates of lime and lead, and thereby the entire mass is rendered very hard, and capable of resisting the changes of the atmosphere.

In carrying out my invention I take, sand, eight parts; cement, four parts; pounded shells, (carbonate of lime,) three parts; litharge, one part, and mix with sufficient water to form a plastic mass, which is pressed in molds of the required shape.

The articles thus produced are then dried for five or six days, at a temperature of sixty to sixty-six degrees, and, after that, they are introduced in a solution composed of silicate of potash, two parts; water, ninety-nine parts; whereby the carbonate of lime is transformed into silicate of lime, and the litharge caused to combine with a portion of the silicic acid, so as to form silicate of lead, and, by the silicates of lime and lead thus produced in the mass, the articles are rendered very hard, and capable or resisting moisture and the changes of the atmosphere.

Litharge is dissolved in diluted sulphuric acid, and left standing for two days, so that it forms sulphate of lead. By adding this solution to the remaining ingredients, a portion of the carbonate of lime is transformed into sulphate of lime, while the lead enters in combination with the carbonic acid, and, by the action of the sulphate of lime and carbonate of lead, thus distributed through the mass, a certain degree of elasticity is imparted to the stone, which materially preserves its durability.

After removing the articles from the solution of potash, they are dried from ten to fourteen days, when they are ready for use.

I am aware that a block of sand and lime treated with silicate of soda is not new; therefore such I do not claim, but

What I claim as new, and desire to secure by Letters Patent, is—

A compound for artificial stone made of the ingredients herein specified, and afterward treated with a solution of silicate of potash, substantially as and for the purpose set forth.

This specification signed by me this 5th day of January, 1870.

CARL SCHAEFFER.

Witnesses:
W. HAUFF,
E. F. KASTENHUBER.